(12) United States Patent
Stokman

(10) Patent No.: US 9,426,385 B2
(45) Date of Patent: Aug. 23, 2016

(54) IMAGE PROCESSING BASED ON SCENE RECOGNITION

(71) Applicant: EUCLID VISION TECHNOLOGIES B.V., Amsterdam (NL)

(72) Inventor: Henricus Meinardus Gerardus Stokman, Amsterdam (NL)

(73) Assignee: Qualcomm Technologies, Inc., San Diego, CA (US)

(*) Notice: Subject to any disclaimer, the term of this patent is extended or adjusted under 35 U.S.C. 154(b) by 0 days.

(21) Appl. No.: 14/616,634

(22) Filed: Feb. 6, 2015

(65) Prior Publication Data
US 2015/0227805 A1 Aug. 13, 2015

(30) Foreign Application Priority Data

| Feb. 7, 2014 | (WO) | .................. PCT/EP2014/052471 |
| Feb. 10, 2014 | (WO) | .................. PCT/EP2014/052557 |
| Feb. 13, 2014 | (WO) | .................. PCT/EP2014/052864 |
| Jul. 3, 2014 | (WO) | .................. PCT/EP2014/064269 |

(51) Int. Cl.
*G06K 9/36* (2006.01)
*H04N 5/262* (2006.01)
*G06K 9/00* (2006.01)
*H04N 5/232* (2006.01)

(52) U.S. Cl.
CPC .......... *H04N 5/2621* (2013.01); *G06K 9/00664* (2013.01); *H04N 5/23219* (2013.01); *H04N 5/23245* (2013.01)

(58) Field of Classification Search
USPC ....................................................... 382/286
See application file for complete search history.

(56) References Cited

U.S. PATENT DOCUMENTS

| 2006/0023077 A1* | 2/2006 | Alton .................... G06T 3/4092 348/222.1 |
| 2007/0297641 A1* | 12/2007 | Criddle ............. G06K 9/00375 382/100 |
| 2010/0278505 A1* | 11/2010 | Wu ......................... G10L 15/10 386/285 |

FOREIGN PATENT DOCUMENTS

EP 1 695 548 A2 8/2006

OTHER PUBLICATIONS

Microsoft Corporation, "PhotoDNA & PhotoDNA Cloud Service Fact Sheet", 1 pg., (Dec. 2009).

(Continued)

*Primary Examiner* — Yon Couso
(74) *Attorney, Agent, or Firm* — Blakely, Sokoloff, Taylor & Zafman LLP

(57) ABSTRACT

Digital image processing is described that enables live prevention of recording and/or displaying of unwanted images. A device for processing a time sequence of images is provided. The device is configured to: retrieve an image of the time sequence of images from a memory; perform scene recognition on the retrieved image; and perform an action on the retrieved image, based upon the result of the scene recognition, before the images of the time sequence of images are recorded, displayed, and/or stored. The retrieval of the image, the performance of the scene recognition, and the performance of the action can be performed in real-time. The action can include at least one of adapting at least a part of retrieved image, modifying the retrieved image, preventing storage of the retrieved image, preventing a display of the retrieved image, erasing the retrieved image, or encrypting the retrieved image.

20 Claims, 5 Drawing Sheets

(56) References Cited

OTHER PUBLICATIONS

Jae-Pil Heo, et al., "Spherical Hashing", IEEE Conference on Computer Vision and Pattern Recognition (CVPR), pp. 2957-2964, (Jun. 16-21, 2012).

Bangpeng Yao, et al., "Combining Randomization and Discrimination for Fine-Grained Image Categorization", IEEE Conference on Computer Vision and Pattern Recognition (CVPR), pp. 1577-1584, (Jun. 20-25, 2011).

Rongxiang Hu, et al., "Multiscale Distance Matrix for Fast Plant Leaf Recognition", IEEE Transactions on Image Processing, vol. 21, No. 11, pp. 4667-4672, (Nov. 2012).

Karen Simonyan, et al., "Deep Fisher Networks for Large-Scale Image Classification", Advances in Neural Information Processing Systems, 9 pp., (2013).

C.G.M. Snoek, et al., "The MediaMill TRECVID 2012 Semantic Video Search Engine", Proceedings of the $10^{th}$ TRECVID Workshop, 8 pp., (2012).

Alex Krizhevsky, et al., "ImageNet Classification with Deep Convolutional Neural Networks", Advances in Neural Information Processing Systems 25, 9 pp., (2012).

Paul Viola, et al., "Robust Real-Time Face Detection", International Journal of Computer Vision, vol. 57, No. 2, pp. 137-154, (2004).

Roberto Brunelli, et al., "Face Recognition: Features versus Templates", IEEE Transactions on Pattern Analysis and Machine Intelligence, vol. 15, No. 10, pp. 1042-1052, (Oct. 1993).

C.G.M. Snoek, et al., "MediaMill at TRECVID 2013: Searching Concepts, Objects, Instances and Events in Video", Proceedings of the $11^{th}$ TRECVID Workshop, 6 pp., (2013).

PCT International Search Report for PCT Application No. PCT/EP2014/052471, 6 pp., (Sep. 1, 2014).

PCT Written Opinion of the International Searching Authority for PCT Application No. PCT/EP2014/052471, 13 pp., (Sep. 1, 2014).

PCT International Search Report for PCT Application No. PCT/EP2014/064269, 3 pp., (Dec. 19, 2014).

PCT Written Opinion of the International Searching Authority for PCT Application No. PCT/EP2014/064269, 6 pp., (Dec. 19, 2014).

Roberto Brunelli, "Template Matching Techniques in Computer Vision—Theory and Practice—Code Companion", John Wiley & Sons, Ltd., 58 pp. (including cover page, title page, copyright page, table of contents, and chapters 1-3 and 10), (Mar. 19, 2009).

\* cited by examiner

IMAGE PROCESSING BASED ON SCENE RECOGNITION

CROSS-REFERENCE TO RELATED APPLICATIONS

The present application claims, under 35 U.S.C. §§119(a)-(d) and 365(a), priority to and the benefit of (i) PCT International Application No. PCT/EP2014/052471, filed on Feb. 7, 2014, entitled DEVICE FOR PROCESSING A TIME SEQUENCE OF IMAGES, ALLOWING SCENE DEPENDENT IMAGE MODIFICATION, which is hereby incorporated by reference; (ii) PCT International Application No. PCT/EP2014/052557, filed on Feb. 10, 2014, entitled DEVICE FOR PROCESSING A TIME SEQUENCE OF IMAGES, ALLOWING SCENE DEPENDENT IMAGE MODIFICATION, which is hereby incorporated by reference; (iii) PCT International Application No. PCT/EP2014/052864, filed on Feb. 13, 2014, entitled DEVICE FOR PROCESSING A TIME SEQUENCE OF IMAGES, ALLOWING SCENE DEPENDENT IMAGE MODIFICATION, which is hereby incorporated by reference; and (iv) PCT International Application No. PCT/EP2014/064269, filed on Jul. 3, 2014, entitled DEVICE FOR PROCESSING IMAGES BASED UPON LIVE SCENE RECOGNITION ALLOWING SCENE DEPENDENT IMAGE MODIFICATION (BEFORE THE IMAGES ARE BEING RECORDED OR BEING DISPLAYED), which is hereby incorporated by reference.

BACKGROUND

1. Field

Embodiments described herein relate generally to the field of image processing; and more specifically, to digital image processing that enables live prevention of recording, displaying, and/or storage of unwanted images and/or videos.

2. Description of Related Art

Devices for capturing, processing, displaying, and filtering digital images and/or videos were developed over the last ten years. Some of these devices include an image processor that allows for pre-processing of a captured or stored image. Pre-processing an image includes performing at least one of noise reduction, color adjustment, white balancing, image encoding and decoding, or other pre-processes known in the art on the image so as to change the characteristics of the image before the image is recorded, displayed, and/or stored. Pre-processing, in some situations, can be performed on at least one of the images in a set of images that is being recorded and/or displayed as the images are being recorded and/or displayed. For example, pre-processing that includes image filtering to obscure visual content is described by U.S. Patent Application No. 2007/297641 to Linda Criddle et al. (hereinafter "Criddle"). In Criddle, the images used for comparison were previously recorded and stored on a central server. Thus, in order to apply Criddle's image filtering process, the reviewing and analyzing of the content is performed by a central server and not by the device that is recording or displaying the image to the user. Criddle's device, therefore, necessarily depends on a central server and a means of communication with the central server to perform a correct filtering according to Criddle's image filtering process.

Photographic filters are well known for modifying recorded images. Sometimes photographic filters are used to make only subtle changes to an image; other times the image would simply not be possible without the use of photographic filters. Some photographic filters, such as coloring filters, affect the relative brightness of different colors—for example, red lipstick may be rendered as any color from almost white to almost black with different filters. Some photographic filters change the color balance of images, so that photographs under incandescent lighting show colors as they are perceived, rather than with a reddish tinge. There are photographic filters that distort the image in a desired way—for example, diffusing an otherwise sharp image, adding a starry effect, blur or mask an image, etc.

Photographic filters have gained popularity and are available in popular apps like Instagram©, Camera+©, EyeEm©, Hipstamatic©, Aviary©, and so on. These photographic filters typically adjust, locally or globally, an image's intensity, hue, saturation, contrast, or color curves per red, green or blue color channel. Other typical functions provided by these photographic filters include modifying an image by applying color lookup tables; overlaying one or more masking filters such as a vignetting mask (darker edges and corners); cropping an image to adjust the width and height; adding borders to an image so as to generate, for example, the Polaroid effect; and combinations thereof. Different photographic filters are applied to different types of images in order to obtain an aesthetically pleasing picture. For example, as explained in an article published on Mashable's website entitled "How to Choose the Best Instagram Filter for Your Photo." Well-known examples of photographic filters provided by, for example, the Instagram© app, are as follows:

Rise Filter© for close-up shots of people;
Hudson Filter© for outdoor photos of buildings;
Sierra Filter© for nature outdoor shots;
Lo-Fi Filter© for shots of food;
Sutro Filter© for photos of summer events, nights out, bbq's, picnics;
Brannan Filter© if image has strong shadows;
Inkwell Filter© if light and shadow are prominent in image;
Hefe Filter© if image has vibrant colors (rainbows); and so on.

Once a user has captured or recorded an image, a photographic filter operation or combination thereof can be applied to the image in an interactive mode, where the user manually selects the filter that gives a desired aesthetic effect. Manually editing a captured or recorded photograph is known for instance from European Patent Application No. 1695548 to Benjamin N. Alton et al. and U.S. Patent Application No. 2006/0023077 to Benjamin N. Alton et al.

SUMMARY

One or more examples of the inventive concepts described herein relate to digital image processing that enables live prevention of recording, displaying, and/or storing unwanted images and/or videos.

For one example, a device for processing a time sequence of images is provided. The device is configured to: retrieve an image of the time sequence of images from a memory; perform scene recognition on the retrieved image; and perform an action on the retrieved image, based upon the result of the scene recognition, before the images of the time sequence of images are recorded, displayed, or stored. The retrieval of the image, the performance of the scene recognition on the retrieved image, and the performance of the action on the retrieved image can be performed in real-time. The action can include at least one of adapting at least a part of retrieved image, modifying the retrieved image, preventing the retrieved image from being stored in a data storage, preventing the retrieved image from being displayed on a display device, erasing the retrieved image from the memory; or encrypting the retrieved image. For one example, the device for processing a time sequence of images is included in an imaging system. For one example, the device for processing a time sequence of images is included in a display system. For one example, the device for processing a time sequence of images is included in a camera. For one example, the device for processing a time sequence of images is included in a display screen device.

For one example, a non-transitory computer-readable medium storing instructions that can be executed by one or more processors in a processing device is provided. For one example, the execution of the instructions in the non-transitory computer-readable medium by one or more processing devices causes the one or more processing devices to perform a method for processing a time sequence of images. For one example, the method for processing a time sequence of images that is performed by the one or more processing devices includes: retrieving an image of the time sequence of images from a memory, where the time sequence of images is temporarily stored; performing scene recognition on the retrieved image; and performing an action on the retrieved image, based upon the result of the scene recognition, before the images of the time sequence of images are recorded, displayed, or stored. For one example of the method, the retrieval of the image, the performance of the scene recognition on the retrieved image, and the performance of the action on the retrieved image is performed in real-time. For one example of the method, the action includes at least one of adapting at least a part of retrieved image, modifying the retrieved image, preventing the retrieved image from being stored in a data storage, preventing the retrieved image from being displayed on a display device, erasing the retrieved image from the memory; or encrypting the retrieved image.

For one example, a computer-implemented method for processing a time sequence of images is provided. For one example, the computer-implemented method for processing a time sequence of images includes: retrieving an image of the time sequence of images from a memory, where the time sequence of images is temporarily stored in the memory; performing scene recognition on the retrieved image; and performing an action on the retrieved image, based upon the result of the scene recognition, before the images of the time sequence of images are recorded, displayed, or stored. For one example of the computer-implemented method, the retrieval of the image, the performance of the scene recognition on the retrieved image, and the performance of the action on the retrieved image is performed in real-time. For one example of the computer-implemented method, the action includes at least one of adapting at least a part of retrieved image, modifying the retrieved image, preventing the retrieved image from being stored in a data storage, preventing the retrieved image from being displayed on a display device, erasing the retrieved image from the memory; or encrypting the retrieved image.

Other advantages and features will become apparent from the accompanying drawings and the following detailed description.

BRIEF DESCRIPTION OF THE DRAWINGS

Embodiments described herein are illustrated by way of example and not limitation in the figures of the accompanying drawings, in which like references indicate similar elements.

DETAILED DESCRIPTION

Figure 1:
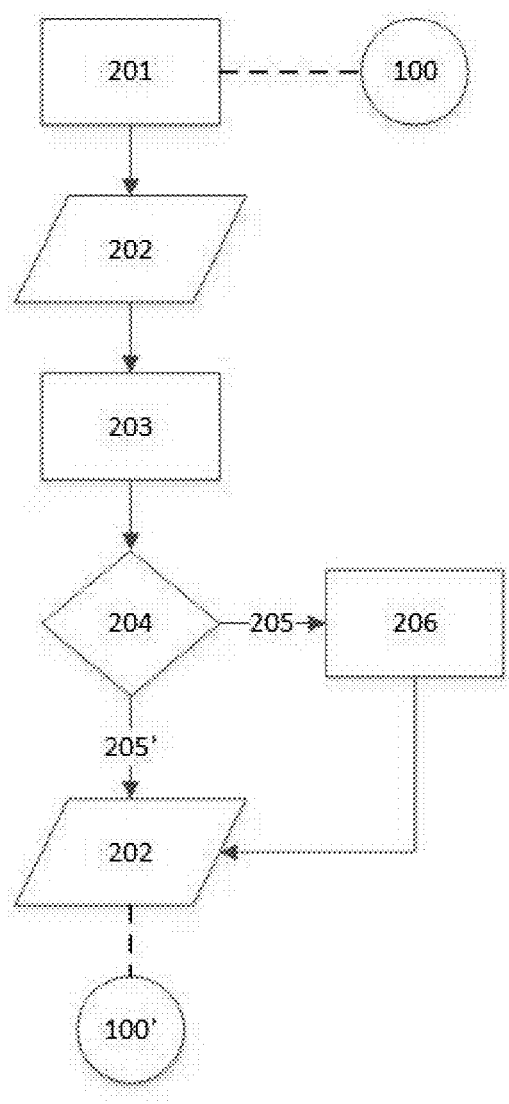
FIG. 1 illustrates, in block diagram form, a device for processing a time sequence of images.

Embodiments described herein relate to digital image processing that enables live prevention of recording, displaying, and/or storing unwanted images. For an embodiment, a device for processing a time sequence of images is provided. The device is configured to: retrieve an image of the time sequence of images from a memory; perform scene recognition on the retrieved image; and perform an action on the retrieved image, based upon the result of the scene recognition, before the images of the time sequence of images are recorded, displayed, or stored. For a further embodiment, the retrieval of the image, the performance of the scene recognition on the retrieved image, and the performance of the action on the retrieved image are performed in real-time. For a further embodiment, the action includes at least one of adapting at least a part of retrieved image, modifying the retrieved image, preventing the retrieved image from being stored in a data storage, preventing the retrieved image from being displayed on a display device, erasing the retrieved image from the memory; or encrypting the retrieved image.

At least one of the described embodiments relates to an imaging system that includes an image sensor for capturing an image, a memory for storing the image, and the device that is described below in FIGS. 1-3. At least some of the described embodiments relate to an image display system that includes a memory for receiving an image for displaying, a display device for displaying the image, and the device that is described below in FIGS. 1-3.

Embodiments described herein also relate to a non-transitory computer-readable medium storing instructions for digital image processing that enables live prevention of recording, displaying, and/or storing unwanted images, the instructions including computer executable code which, when executed by one or more processors of a processing device, configure the processing device to: retrieve an image of the time sequence of images from a memory; perform scene recognition on the retrieved image; and perform an action on the retrieved image, based upon the result of the scene recognition, before the images of the time sequence of images are recorded, displayed, or stored. For a further embodiment, the retrieval of the image, the performance of the scene recognition on the retrieved image, and the performance of the action on the retrieved image are performed in real-time. For a further embodiment, the action includes at least one of adapting at least a part of retrieved image, modifying the retrieved image, preventing the retrieved image from being stored in a data storage, preventing the retrieved image from being displayed on a display device, erasing the retrieved image from the memory; or encrypting the retrieved image. For some embodiments, a data carrier is provided with the instructions including computer executable code that are described above. For other embodiments, a non-transitory signal carries at least part of the instructions including computer executable code that are described above. For yet other embodiments, a non-transitory signal sequence to be executed by one or more processors of a computer as one or more computer-executable instructions includes the instructions including computer executable code that are described above.

Embodiments described herein also relate to a computer-implemented method for digital image processing of a time sequence of images to enable live prevention of recording, displaying, and/or storing unwanted images, the method comprising: retrieving an image of the time sequence of images from a memory; performing scene recognition on the retrieved image; and performing an action on the retrieved image, based upon the result of the scene recognition, before the images of the time sequence of images are recorded, displayed, or stored. For a further embodiment of the computer-implemented method, the retrieval of the image, the performance of the scene recognition on the retrieved image, and the performance of the action on the retrieved image are performed in real-time. For a further embodiment of the method, the action includes at least one of adapting at least a part of retrieved image, modifying the retrieved image, preventing the retrieved image from being stored in a data storage, preventing the retrieved image from being displayed on a display device, erasing the retrieved image from the memory; or encrypting the retrieved image.

Scene recognition, which is based on scene recognition algorithms, enables one embodiment of the inventive concepts described below in FIGS. 1-7 to understand a scene that is captured in an image or a video. For this embodiment, scene recognition includes at least one of recognizing a scene, recognizing objects within a scene, or recognizing an event in a scene. Understanding scenes in this way can assist with preventing unwanted scenes, objects, or events from being displayed, recorded, and/or stored by cameras, display devices, imaging systems, etc. For example, a display device (e.g., a screen, a monitor) that includes an embodiment of the device would not be able to show child pornography even though the display device would receive an input signal containing the unwanted images. In another example, a camera device (e.g., a digital camera, etc.) that includes one embodiment of the inventive concepts described below in FIGS. 1-7 would not be able to record an image or a video of a child pornography scene, even when the camera device is pointing at a child pornography scene. In yet another example, the camera device that includes one embodiment of the inventive concepts described below in FIGS. 1-7 is enabled to automatically improve and/or filter captured and/or recorded images or videos.

As used herein, an "image" refers to a digital image. Usually, an image is composed of pixels that each have a digital value representing a quantity of light. An image can be represented by a picture or a photograph. An image can be part of a set of images.

As used herein, "capturing an image" and its variations refer to the capturing and not the recording of the image. Recording an image is a separate and distinct activity from capturing an image.

As used herein, "recording an image" and its variations refer to recording an image after the image has been captured and processed.

FIG. 1 illustrates, in block diagram form, a device that receives digitized images through module 201. The image or images can be a representation of scene 100. For one embodiment, the images are a time sequence of images. For one embodiment, the images are a live sequence of images. For one embodiment, a time sequence of images includes a live sequence of images. These images are stored in a temporary memory 202.

For one embodiment, the captured image(s) are subjected to scene recognition in module 203. Scene recognition is described above. For one embodiment, scene recognition includes recognition of different types of images or videos using at least one of: (i) one or more computer vision algorithms; or (ii) one or more machine learning algorithms.

Exemplary scene recognition algorithms include at least one of:
Calculating the unique digital signature of an image and then matching that signature against those of other photos [see, for particular embodiments, Microsoft Photo DNA Fact Sheet December 2009 by Microsoft Corporation; or Heo et al., "Spherical hashing," in Computer Vision Pattern Recognition Conference, 2012];
Discriminative feature mining [see, for particular embodiments, Bangpeng Yao, Khoshla, Li Fei-Fie, "Combining randomization and discrimination for fine-grained image categorization," in Computer Vision Pattern Recognition Conference, 2011];
Contour-based shape descriptors [see, for particular embodiments, Hu, Jia, Ling, Huang, "Multiscale Distance Matrix for Fast Plant Leaf Recognition", IEEE Trans. on Image Processing (T-IP), 21(11):4667-4672, 2012];
Deep Fisher networks [see, for particular embodiments, Simonyan, Vedaldi, Zisserman, "Deep Fisher Networks for Large-Scale Image Classification", in Advances in Neural Information Processing Systems, 2013];
Bag of Words/Support vector machines [see, for particular embodiments, Snoek et al, "The MediaMill TRECVID 2012 Semantic Video Search Engine," in Proceedings of the 10th TRECVID Workshop, Gaithersburg, USA, 2012];
Deep learning [see, for particular embodiments, Krizhevsky, A., Sutskever, I. and Hinton, "G. E. ImageNet Classification with Deep Convolutional Neural Networks," Advances in Neural Information Processing 25, MIT Press, Cambridge, Mass.];
Template matching based on the characteristic shapes and colors of objects [see, for particular embodiments, R. Brunelli, "Template Matching Techniques in Computer Vision: Theory and Practice," Wiley];
Face detection [see, for particular embodiments, Viola Jones, "Robust Real-Time Face Detection," International Journal of Computer Vision, 2004];
Face recognition [see, for particular embodiments, R. Brunelli and T. Poggio, "Face Recognition: Features versus Templates," IEEE Trans. on PAMI, 1993]; or
a combination thereof [see, for particular embodiments, Snoek et al, "MediaMill at TRECVID 2013: Searching Concepts, Objects, Instances and Events in Video," in Proceedings of the 11th TRECVID Workshop, Gaithersburg, USA, 2013.].

For an embodiment, the inventive concepts described herein (e.g. the device described in connection with FIG. 1) adapt machine learning methods and software compilation techniques to embed scene recognition functionalities within a set of computer executable instructions that include software code portions, which can be executed on a data processor of a processing device. For one embodiment, a processing device including the device described in connection with FIG. 1 is designed to fit within portable devices such as, but not limited to, cameras, phones, smartphones, and digital tablets. For an embodiment, the device described in connection with FIG. 1 includes the processor device and is configured to capture and process images faster than a human eye is able to, by tuning the performance of the scene recognition. As a result, for this embodiment, the processed images are adapted and prevented from being displayed, recorded, and/or stored in real-time. For an embodiment, the device described in connection with FIG. 1 includes automated enhancing of images and filtering of images based upon the understanding of their contents. An advantage of one embodiment of the device described in connection with FIG. 1 is that a user that is operating a device that includes this embodiment can be relieved from having to manually select a photographic filter to aesthetically improve a captured or recorded image or video that the user wants to manipulate. For this embodiment, the device described in connection with FIG. 1 automatically applies one or more photographic filters known in the art based on one or more results of the scene recognition algorithms that are used to understand the scene.

For one embodiment of the device described in connection with FIG. 1, based on the result of the scene recognition in module 204, an identifier 205 or 205' may be applied to the images and used to further process the images representing scene 100. As described above in connection with module 203, during the processing of the images for scene recognition, at least one of a setting, an object, or an event is identified. For an embodiment, after the identification, at least one of a label, an identifier (e.g., a number or a letter), or a hash function is applied to the processed image. For one embodiment, the label, the identifier (e.g., a number or a letter), or the hash function that is applied to the processed image relates to or correlates to the result of the scene recognition.

For an embodiment of the device described in connection with FIG. 1, an action is performed by module 206 to alter the images. For one embodiment, the action is performed or not performed based on at least one of identifier 205 or 205'. For one embodiment, the action is to further process the images based on identifier 205. For a further embodiment, the action is prevented from being performed based on identifier 205'.

For one embodiment, the action is based on matching identifier 205 to a predefined identifier, which in turn triggers an altering of the images in module 206. For one embodiment, if identifier 205' is matched, then the action is prevented from being performed, i.e., the altering of the images representing scene 100 is prevented based on matching identifier 205' with a predefined identifier. For each of the two preceding embodiment, the altered/unaltered images now represent scene 100', which are stored in the temporary memory 202.

For one embodiment, parts of the altered/unaltered images representing scene 100', may be modified (e.g., blurred, etc.) when the action is performed in module 206. For one embodiment, the action includes at least one of: scene modification that includes adapting at least a part of the scene 100 into scene 100'; modifying one or more of the processed images representing scene 100 into one or more modified images representing scene 100'; blocking storage of one or more of the images representing scene 100; blocking a displaying of one or more of the images representing scene 100; deleting, from memory 202, one or more of images representing scene 100; or encrypting one or more of the images representing scene 100. For yet another embodiment, the action includes applying photographic filters known in the art to one or more of the images representing scene 100 to achieve one or more modified images representing scene 100'.

For one embodiment, the modification of one or more of the processed images representing scene 100 into one or more modified images representing scene 100' is performed using image modification algorithms known in the art. For one embodiment, the modification action is performed in real-time. In particular, the image modification algorithms can be used in real-time to modify one or more of the processed images representing scene 100 into one or more modified images representing scene 100'. For an embodiment, the modification actions can be applied to a time sequence of images that represent scene 100. For example, the images representing scene 100 are collectively a sequential recording of images that are used during filming to form a video of scene 100. For an embodiment, the modification action is performed before an image or a sequence of images (e.g., one or more of the images representing scene 100) is recorded, displayed, and/or stored. In this way, the image recognition may be (i) performed on images that are captured and presented in a live preview (e.g., a live sequence of images, a time sequence of images, etc); (ii) performed on only a subset of the captured images from that live sequence; or (iii) performed on each of images that is displayed in the preview.

For some embodiments, the device described in connection with FIG. 1 can optionally be in communication with a server (not shown). Such a server may be one server device—for example, a computer device that is in a remote location. Alternatively, for some embodiments, the server refers to one or more server devices that are connected via one or more data connections, at the same location and/or located at physically/geographically remote locations from each other.

For one embodiment, the device described in connection with FIG. 1 comprises a data storage (not shown) for storing one or more of the altered/unaltered images representing scene 100'. For this embodiment, the device is adapted for performing an action, as described above, before storing one or more of the altered/unaltered images representing scene 100' in the data storage (not shown). The data storage may comprise a hard disk, solid state disk (SSD), but may also relate to external storage, for instance remote external storage like cloud storage.

For one embodiment, the device described in connection with FIG. 1 comprises a display device (not shown) for displaying one or more of the images representing scene 100 or one or more of the images representing scene 100'. For this embodiment, the device is adapted to perform an action before displaying the image(s) on its display device.

Image recording and image displaying can commonly be combined on a single device. Many common image recording devices include a display device that allows a user to directly view images as the images are captured in real-time. In some of these common image recording devices, the display device functions as a viewer that allows the user to modify a captured image. For example, once the user selects a button to capture or record a picture or a film, an image sensor of the common image recording device captures an image or a sequence of images that represents the picture or the film. In this example, the image(s) are then pre-processed by an image processor of the common image recording device and stored in a memory of the common image recording device. Often, the captured image(s) are also displayed on the display device that is part of the common image recording device. In such situations, a user may manually apply further image processing—for example, filtering, red-eye reduction, etc. For one embodiment, the device described in connection with FIG. 1 is included in an image recording device that includes a display device, an image sensor, an image processor, and a memory. For this embodiment, the device enables at least one of scene recognition or image modification actions (as described above) to be performed before the image(s) are previewed, displayed, recorded, and/or stored using the image recording device.

Some common image recording devices can be in a burst mode or a continuous capture mode to enable video or a series of images to be captured in a rapid sequence. In this burst mode or continuous capture mode, a time sequence of images can be captured. For example, images captured at a video frame rate and used to create a film. Often, such a frame rate is at least 20 frames per second (fps), or more specifically, at least 30 fps. One example of a time sequence of images includes a recording of a film, as described in the preceding example. One example of a time sequence of images includes a functionally live view through a viewer or a display device of a digital camera. In particular, when a digital viewer of a common image recording device is used, a functionally live sequence of images is displayed via the viewer. One example of a time sequence of images includes a live sequence of images. For one embodiment, a time sequence of images includes at least one of an image, a sequence of images, a recording of a video, a live view of images, or a live sequence of images.

One embodiment of an image recording device that can be in a burst mode or a continuous capture mode includes the device described in connection with FIG. 1. For this embodiment, the device applies the actions, as described in connection with FIG. 1, to each of the images being displayed on the viewer. The time sequence of images may have a time base. The time between the images may be constant, like for instance in a film. The time sequence of images may also comprise subsequent bursts of images, each burst having the same of different time between subsequent bursts. For an embodiment, the action, as described above, is being performed on at least one of the images of the time sequence of images. For example, the scene recognition is performed on an image of a time sequence of images (e.g., the images representing scene 100). For this example, images that follow or precede the image may be processed using the same or a different action. Thus, if the time between images that are subjected to scene recognition is relatively small—e.g., small with respect to the vision capabilities of a human—then, an almost constant visual sequence of images can be processed. For an embodiment, the device described in connection with FIG. 1 is adapted for performing scene recognition on at least a subset of the time sequence of images. For instance, a set of continuous images of the time sequence of images are subjected to scene recognition. Alternatively, each $n^{th}$ image of the time sequence of images can be subjected to scene recognition.

For one embodiment, the device described in connection with FIG. 1 allows the action to be dependent upon the result of the scene recognition. For this embodiment, the device is adapted to apply an identifier to the image(s) based on one or more results of applying scene recognition algorithms to the image(s). An identifier can be a number or a letter. An identifier may also be another type of label—for instance, a hash function. For a further embodiment, if the identifier matches a predefined identifier, then based upon the match, the device described in connection with FIG. 1 performs a particular action on the images. For example, if the scene, object, or event changes, the device described in connection with FIG. 1 also changes the action in response of the changing scene, object, or event. As described above, for one embodiment, the action includes at least one of image modification that includes adapting at least part of the image, modifying the image into a modified image, blocking storage of the image, or erasing the image from the memory, encrypting the image.

For an embodiment, the time sequence of images includes at least one of a sequence of live images or a sequence of images that form a video film. For this embodiment, one or more images of the entire time sequence may be subjected to scene recognition.

For an embodiment, the scene recognition algorithm includes at least one of: calculating the unique digital signature of an image and then matching that signature against those of other photos, of discriminative feature mining; calculating and using contour-based shape descriptors; calculating and using deep Fisher networks; calculating and using Bag of Words; calculating and using support vector machines, calculating and using deep learning; calculating and using face detection; or calculating and using template matching based on the characteristic shapes and colors of objects.

For one embodiment, the modifying of an image by the device includes blurring at least a part of the image. For example, a part of a scene that has been recognized is blurred, an object in the scene that has been recognized is blurred, an event in the scene that has been recognized is blurred, etc. In this way, the device described in connection with FIG. 1 makes it possible to blur parts of images before recording, displaying, and/or storing the images. Thus, it may be possible to provide an image recorder, digital camera, or computer display that cannot record, display, and/or store unwanted scenes (or events and/or objects within those scenes).

For an embodiment, the device described in connection with FIG. 1 performs one or more actions that include processing of an image by application of one or more photographic filters to the image. Photographic filters are known in the art. For an embodiment, the device described in connection with FIG. 1 comprises an image sensor adapted for capturing an image, where scene recognition is performed on the image, and an action is performed on the captured image. For a further embodiment, the action is performed on the captured image before a next image is captured. For another embodiment, the device comprises an image sensor for capturing a series of images that form a film, where scene recognition is performed on at least one of the images, and an action is performed on the at least one captured image. For yet another embodiment, the action is performed on the at least one captured image before at least one next image is captured.

As described above, one embodiment of the inventive concepts described herein adapts machine learning methods and software compilation techniques to embed scene recognition functionalities within a set of computer executable instructions that include software code portions. For one embodiment, the set of computer executable instructions is provided with a data carrier. For one embodiment, a non-transitory signal carries at least part of the set of computer executable instructions. For one embodiment, a signal sequence representing the set of computer executable instructions can be executed on a computer.

Figure 2:
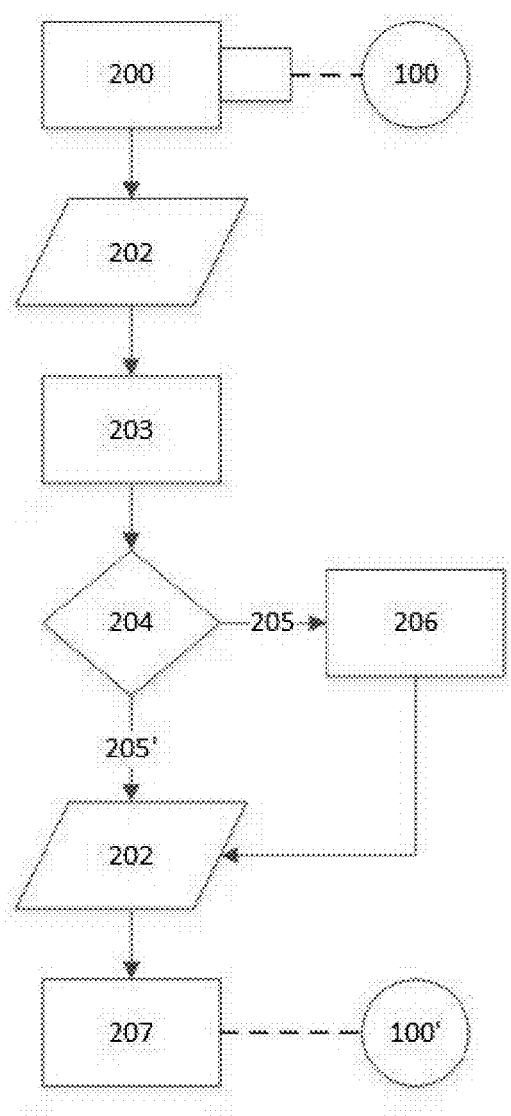
FIG. 2 illustrates, in block diagram form, an imaging system including a device for processing a time sequence of images.

FIG. 2 schematically depicts an imaging system that captures images through camera 200. For one embodiment, the device described in connection with FIG. 1 is part of an image recording device (e.g., the imaging system described in connection with FIG. 2 that includes a camera 200, camera 200 itself, etc.). The camera 200 can include an image sensor for capturing one or more images. The image sensor can be formed from a complementary metal-oxide-semiconductor (CMOS) device or any other devices used to form an image sensor as known in the art—for example, semiconductor charge-coupled devices (CCD), N-type metal-oxide-semiconductor (NMOS) technologies, etc. For one embodiment, the image sensors are spatial image sensors, which allow for capturing one or more images that are at least two-dimensional images.

For one embodiment, the camera 200 captures one or more images that represent scene 100. The images are stored in a temporary memory 202, as described above in connection with FIG. 1. An image that is captured by an image sensor of the camera 200 is clocked out or read out of an image sensor and digitized into a stream of digital values representing a digital pixel image. In some situations, the image recording device (e.g., camera 200) may include an image processor for providing some pre-processing and temporary storage 202 of a captured image. Examples of this pre-processing includes color correction, white balancing, noise reduction, image conversion for converting and/or compressing an image into a different digital file format, etc.

Next, these images are subjected to scene recognition in module 203. The scene recognition is performed in accordance with the description provided above in connection with FIG. 1. Based on the result of the scene recognition in module 204, an identifier 205 or 205' may be provided to the images. The identifier is provided in accordance with the description provided above in connection with FIG. 1. Based upon the identifier, one or more actions (as described above in connection with FIG. 1) may be performed on the images in module 206 or the action may be prevented from being performed on the images (as described above in connection with FIG. 1).

Next, the images representing scene 100, which now represent scene 100', are stored in a temporary memory 202 (as described above in connection with FIG. 1). Furthermore, for one embodiment, one or more of the images representing scene 100' is recorded in module 207.

For one embodiment of an imaging system (such as the one described in connection with FIG. 2), an image, a set of images, or a sequence of images is stored into a memory, and may be pre-processed so to enable the image(s) to be displayed. The imaging system may comprise a display screen (e.g., an OLED panel, an LCD panel, etc.) or may comprise a projector for projecting a picture or a film on a remote screen. Often, the image, the set of images or the sequence of images are encoded or decoded.

For an embodiment, an imaging system includes the device described above in connection with FIG. 1. For this embodiment, the device subjects one or more of the image(s) to the scene recognition algorithms and resulting identifiers are applied to the processed image(s). For this embodiment, one of actions (as described above) are performed on the processed image(s), based upon one or more of the resulting identifiers. In particular, the actions are performed before the image(s) are presented to a user via the display screen or projector.

Figure 3:
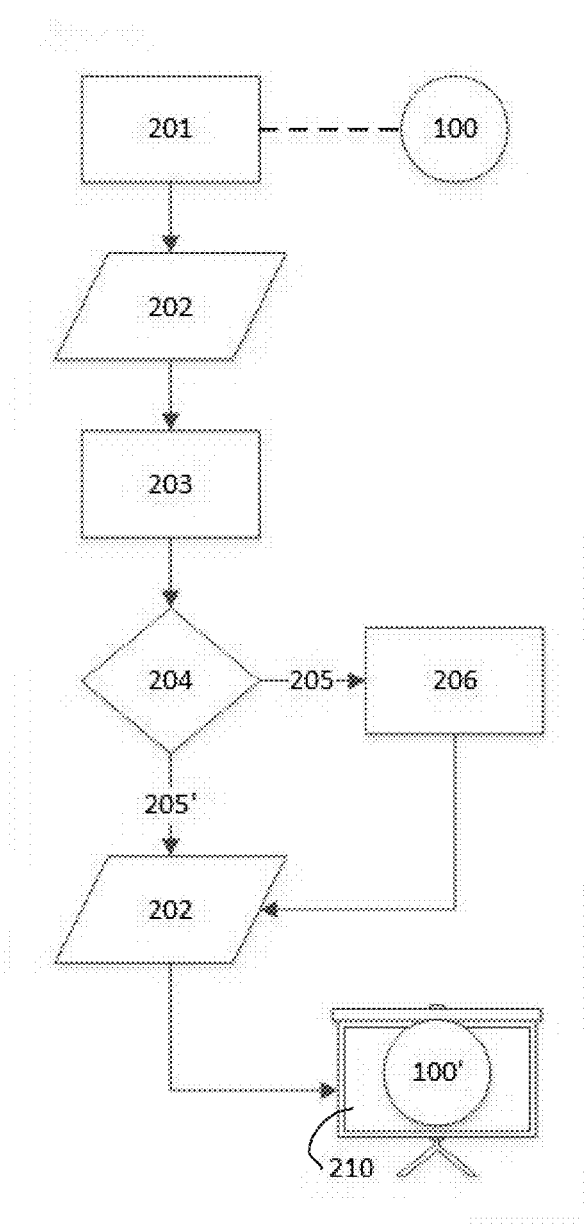
FIG. 3 illustrates, in block diagram form, a display system including a device for processing a time sequence of images.

FIG. 3 schematically depicts a display system that receives digitized images through module 201. These images represent scene 100. The images may be stored in a temporary memory 202, as described above in connection with at least one of FIG. 1 or 2. Next, scene recognition is applied in module 203, as described above in connection with at least one of FIG. 1 or 2. Based on the result of the scene recognition in module 204, an identifier 205 may be provided to the images. The identifier 205 is provided as described above in connection with at least one of FIG. 1 or 2. An action may be performed on the images in module 206, and/or identifier 205' may be used to prevent the altering of the images. The performance of the action is in accordance with at least one of descriptions provided above in connection with FIG. 1 or 2.

Next, images representing scene 100, which now represent scene 100', may be stored in a temporary memory 202, as described above in connection with FIG. 1 or 2. For one embodiment of the display system, one or more of the images representing scene 100' is displayed on screen 210.

For one embodiment of an image display device (e.g., the image display device described in connection with FIG. 3), an image, a set of images, or a sequence of images is stored into a memory, and may be pre-processed so to enable the image(s) to be displayed. The image display device may comprise a display screen (e.g., an OLED panel, an LCD panel, etc.) or may comprise a projector for projecting a picture or a film on a remote screen. Often, the image, the set of images or the sequence of images are encoded or decoded.

For an embodiment, the image display device includes the device described above in connection with at least one of FIG. 1 or 2. For this embodiment, the device subjects one or more of the image(s) to the scene recognition algorithms and resulting identifiers are applied to the processed image(s). For this embodiment, one or more actions are performed on the processed image(s), as described above in connection with at least one of FIG. 1 or 2. For one embodiment, the actions are performed or prevented from being performed based on an identifier, as described above in connection with at least one of FIG. 1 or 2. In particular, the actions are performed before the image(s) are presented to a user via the display screen or projector.

Figure 4:
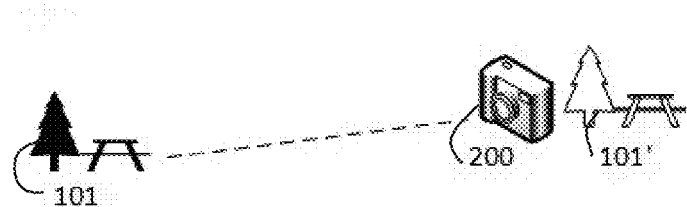
FIG. 4 illustrates an exemplary camera applying a photographic filter on an outdoor scene, where the exemplary camera includes a device for processing a time sequence of images.

FIG. 4 depicts an exemplary camera 200 that recognizes an outdoor scene 101 using scene recognition as described above in at least one of FIG. 1, 2, or 3. For one embodiment, the camera automatically applies a specific photographic filter on the processed images of scene 101, as described above in connection with at least one of FIG. 1, 2, or 3. The modified images are then displayed on the viewer of camera 200 to present the aesthetically enhanced scene 101', as described above in connection with at least one of FIG. 1, 2, or 3. Additionally, the camera 200 allows for modification (e.g., blurring) of at least a part of a scene 101. Unwanted parts of a scene 101 can be modified (e.g., blurred) using one or more of photographic filters. In this way, a user of camera 200 can be prevented from being confronted with unwanted scenes.

Figure 5:
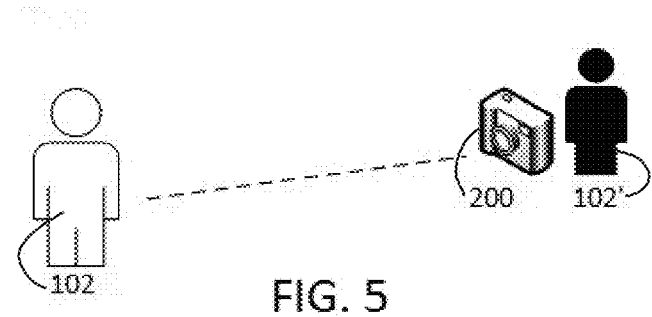
FIG. 5 illustrates an exemplary camera applying a photographic filter on a portrait, where the exemplary camera includes a device for processing a time sequence of images.

FIG. 5 depicts an exemplary camera 200 that recognizes a portrait scene 102 using scene recognition as described above in at least one of FIG. 1, 2, or 3. The camera 200 of FIG. 5 automatically applies a specific photographic filter on the processed images of portrait scene 102, as described above in connection with at least one of FIG. 1, 2, or 3. In addition, the camera 200 displays the modified images on the viewer of camera 200 to present the aesthetically enhanced scene 102', as described above in connection with at least one of FIG. 1, 2, or 3. The camera 200, therefore, allows the device to perform one or more actions, as described above in connection with at least one of FIG. 1, 2, or 3, on a functionally live image or on a sequence of live images.

Figure 6:
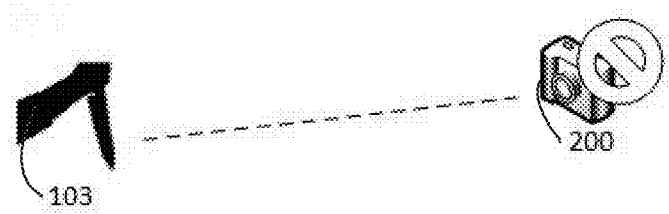
FIG. 6 illustrates an exemplary camera preventing a recording of an unwanted event, where the camera includes a device for processing a time sequence of images.

FIG. 6 schematically shows a camera 200 that recognizes an unwanted event 103 using scene recognition as described above in at least one of FIG. 1, 2, or 3. Camera 200 of FIG. 6 automatically blocks the processed images of event 103 and does not record the event on camera 200. The recognizing of the unwanted event 103 and the subsequent blocking of the unwanted event is performed as described above in connection with at least one of FIG. 1, 2, or 3. For example, unwanted event 103 can be prevented so that children or adults are not exposed to violent, pornographic, abusive, or adult content in an image or a film. The scene recognition, as described above in connection with at least one of FIG. 1, 2, or 3, is used to interpret an image and identify the unwanted event 103. The results of this recognition are then used to block, alter, or blur the unwanted event 103. For one embodiment, the blocking is done, in real-time, when the unwanted event 103 (or an unwanted object/part) is present in a scene during a playback of a film.

Figure 7:
FIG. 7 illustrates an exemplary display screen device preventing a displaying of a scene of an unwanted event, where the exemplary display screen device includes a device for processing a time sequence of images.

FIG. 7 depicts a display screen device 210 that recognizes an unwanted event 103 using scene recognition as described above in at least one of FIG. 1, 2, or 3. The display screen device automatically erases the processed images of event 103 and does not display or present the event on display screen device 210 (e.g., on a display panel of the display screen device 210), as described above in connection with at least one of FIG. 1, 2, or 3. The recognizing of the unwanted event 103 and the subsequent erasing of the unwanted event is performed as described above in connection with at least one of FIG. 1, 2, or 3. For example, unwanted event 103 can be deleted to prevent so that children or adults are not exposed to violent, pornographic, abusive, or adult content in an image or a film. The scene recognition, as described above in connection with at least one of FIG. 1, 2, or 3, is used to interpret an image and identify the unwanted event 103. The results of this recognition are then used to erase the unwanted event 103. For one embodiment, the erasing is done, in real-time, when the unwanted event 103 (or an unwanted object/part) is present in a scene during a playback of a film.

One or more of the inventive concepts described herein relate to a method for processing a set of images. For one embodiment, the method includes performing scene recognition on at least one or more images of the set of images. The scene recognition can be performed as described above in connection with at least one of FIG. 1, 2, or 3. For one embodiment, the method also includes performing an action on one or more subsequent images of the set of images, where the performed action is based upon the result of the scene recognition. For one embodiment, the action is performed as described above in at least one of FIG. 1, 2, or 3. For one embodiment, the action is performed on a large set of images or on a database of images. For one embodiment, the action is automated. For one embodiment, the set of images is a time sequence of images, where the time sequence of images includes at least one of two or more images; a sequence of images; a recording of a video; a live view of one or more images; or a live sequence of images.

As used herein, the terms "first," "second," "third" and the like, are used for distinguishing between similar elements and not necessarily for describing a sequential or chronological order. It is to be understood that the terms so used are interchangeable under appropriate circumstances and that the embodiments described herein are capable of operation in other sequences than described or illustrated herein.

Embodiments described herein that include a device or an apparatus may be described during operation. As will be clear to the person skilled in the art, such embodiments are not limited to methods of operation or devices in operation.

It should be noted that the embodiments described herein illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or operations other than those stated in a claim. The article "a" or "an" preceding an element or an operation does not exclude the presence of a plurality of such elements or operations. Embodiments described herein may be implemented by means of hardware comprising several distinct elements, and by means of a suitably programmed computer. The embodiments described herein that include a device or an apparatus can include one or more means. These means may be embodied by one or more items of hardware. The mere fact that certain measures are recited in mutually different dependent claims does not indicate that a combination of these measures cannot be used to advantage.

One or more of the inventive concepts described herein apply to an apparatus or a device comprising one or more of the characterizing features, as set forth in the description and/or the attached drawings. One or more of the inventive concepts described herein pertain to a method or a process comprising one or more of the characterizing features, as set forth in the description and/or the attached drawings.

The various aspects of one or more of the inventive concepts described herein can be combined to provide additional advantages. Furthermore, some of the features of one or more of the inventive concepts described herein can form the basis for one or more divisional applications.

What is claimed is:

1. A system for processing a time sequence of images, the system comprising:
 a processor; and
 a memory coupled to the processor for storing instructions, which when executed from the memory, cause the processor to perform operations for processing the time sequence of images, the operations including:
  retrieving an image of the time sequence of images from the memory, wherein the time sequence of images is temporarily stored in the memory;
  performing scene recognition on the retrieved image, wherein the scene recognition comprises at least one of recognizing a scene, recognizing objects in the scene, and recognizing an event in the scene;
  applying an identifier to the retrieved image after the scene recognition is performed, wherein the identifier applied to the retrieved image correlates to a result of the scene recognition; and
  performing an action on the retrieved image, based on matching the identifier to a predefined identifier, before the images of the time sequence of images are at least one of recorded, displayed, and stored.

2. The system of claim 1, wherein the action includes at least one of adapting at least a part of retrieved image, modifying the retrieved image, preventing the retrieved image from being stored in a data storage, preventing the retrieved image from being displayed on a display device, erasing the retrieved image from the memory, or encrypting the retrieved image.

3. The system of claim 1, wherein the performance of scene recognition includes processing the retrieved image using at least one scene recognition algorithm.

4. The system of claim 3, wherein the processing includes identifying at least one of a setting, an object, or an event in the retrieved image.

5. The system of claim 4, wherein the system further comprises:
 after processing the identification of the retrieved image, applying the identifier to at least one of the setting, the object, or the event in the retrieved image after the scene recognition is performed.

6. The system of claim 5, wherein the identifier includes at least one of a number, a letter, a label, or a hash function.

7. The system of claim 1, wherein the retrieval of the image, the performance of the scene recognition on the retrieved image, and the performance of the action on the retrieved image are performed in real-time.

8. The system of claim 7, wherein each image of the time sequence of images is retrieved, subjected to the scene recognition, and subjected to the action in a sequential order.

9. The system of claim 7, wherein each $n^{th}$ image of the time sequence of images is retrieved, subjected to the scene recognition, and subjected to the action.

10. A non-transitory computer-readable medium storing instructions which, when executed by one or more processors in a processing device, cause the processing device to perform a method for processing a time sequence of images, the method comprising:

retrieving an image of the time sequence of images from a memory, wherein the time sequence of images is temporarily stored in the memory;

performing scene recognition on the retrieved image, wherein the scene recognition comprises at least one of recognizing a scene, recognizing objects in the scene, and recognizing an event in the scene;

applying an identifier to the retrieved image after the scene recognition is performed, wherein the identifier applied to the retrieved image correlates to a result of the scene recognition; and performing an action on the retrieved image, based on matching the identifier to a predefined identifier, before the images of the time sequence of images are at least one of recorded, displayed, and stored.

11. The non-transitory computer-readable medium of claim 10, wherein the action includes at least one of adapting at least a part of retrieved image, modifying the retrieved image, preventing the retrieved image from being stored in a data storage, preventing the retrieved image from being displayed on a display device, erasing the retrieved image from the memory, or encrypting the retrieved image.

12. The non-transitory computer-readable medium of claim 10, wherein the performance of scene recognition includes processing the retrieved image using at least one scene recognition algorithm.

13. The non-transitory computer-readable medium of claim 12, wherein the processing includes identifying at least one of a setting, an object, or an event in the retrieved image.

14. The non-transitory computer-readable medium of claim 13, wherein the method further comprises:

after processing the identification of the retrieved image, applying the identifier to at least one of the setting, the object, or the event in the retrieved image after the scene recognition is performed.

15. The non-transitory computer-readable medium of claim 14, wherein the identifier includes at least one of a number, a letter, a label, or a hash function.

16. The non-transitory computer-readable medium of claim 10, wherein the retrieval of the image, the performance of the scene recognition on the retrieved image, and the performance of the action on the retrieved image are performed in real-time.

17. The non-transitory computer-readable medium of claim 16, wherein each image of the time sequence of images is retrieved, subjected to the scene recognition, and subjected to the action in a sequential order.

18. The non-transitory computer-readable medium of claim 16, wherein each $n^{th}$ image of the time sequence of images is retrieved, subjected to the scene recognition, and subjected to the action.

19. A computer-implemented method for processing a time sequence of images, the method comprising:

retrieving an image of the time sequence of images from a memory, wherein the time sequence of images is temporarily stored in the memory;

performing scene recognition on the retrieved image, wherein the scene recognition comprises at least one of recognizing a scene, recognizing objects in the scene, and recognizing an event in the scene;

applying an identifier to the retrieved image after the scene recognition is performed, wherein the identifier applied to the retrieved image correlates to a result of the scene recognition; and performing an action on the retrieved image, based on matching the identifier to a predefined identifier, before the images of the time sequence of images are at least one of recorded, displayed, and stored.

20. The computer-implemented method of claim 19, wherein the retrieval of the image, the performance of the scene recognition on the retrieved image, and the performance of the action on the retrieved image are performed in real-time.

* * * * *